(12) United States Patent
Lewis et al.

(10) Patent No.: US 8,057,747 B2
(45) Date of Patent: Nov. 15, 2011

(54) HEAT EXCHANGE SYSTEM

(75) Inventors: Larry Lewis, Houston, TX (US); Jeff Diaz, Houston, TX (US)

(73) Assignee: SME Products, LP, Houston, TX (US)

(*) Notice: Subject to any disclaimer, the term of this patent is extended or adjusted under 35 U.S.C. 154(b) by 69 days.

(21) Appl. No.: 12/605,937

(22) Filed: Oct. 26, 2009

(65) Prior Publication Data

US 2010/0263844 A1 Oct. 21, 2010

Related U.S. Application Data

(63) Continuation of application No. 10/992,870, filed on Nov. 12, 2004, now Pat. No. 7,622,094.

(51) Int. Cl.
*F01N 3/10* (2006.01)

(52) U.S. Cl. ........ 422/173; 422/647; 422/649; 422/198; 422/201

(58) Field of Classification Search .......... 422/173, 422/647, 649, 198, 201; 60/737, 740; 165/160, 165/162, 172
See application file for complete search history.

(56) References Cited

U.S. PATENT DOCUMENTS

| | | | |
|---|---|---|---|
| 3,818,869 A | 6/1974 | Blaskowski | |
| 4,503,902 A | 3/1985 | Zolik | |
| 4,705,101 A | 11/1987 | Warner | |
| 4,739,826 A * | 4/1988 | Michelfelder et al. | ........ 165/133 |
| 4,781,241 A | 11/1988 | Misage et al. | |
| 5,444,971 A | 8/1995 | Holenberger | |
| 5,472,047 A * | 12/1995 | Welkey | .......... 165/172 |
| 5,790,972 A | 8/1998 | Kohlenberger | |
| 5,820,830 A | 10/1998 | McIllroy et al. | |
| 5,855,111 A | 1/1999 | Oguchi et al. | |
| 5,992,141 A * | 11/1999 | Berriman et al. | ........... 60/274 |
| 6,247,682 B1 | 6/2001 | Vouche | |
| 6,497,199 B2 * | 12/2002 | Yamada et al. | ......... 122/367.1 |
| 6,584,760 B1 * | 7/2003 | Lipinski et al. | .......... 60/39.511 |
| 6,663,694 B2 | 12/2003 | Hubbard et al. | |
| 6,667,011 B1 | 12/2003 | Munje et al. | |
| 6,880,628 B2 | 4/2005 | Yoshida et al. | |
| 6,952,925 B2 | 10/2005 | Hallman et al. | |
| 7,056,367 B2 | 6/2006 | Trivett | |
| 7,117,934 B2 | 10/2006 | Lomax, Jr. et al. | |
| 7,220,048 B2 * | 5/2007 | Kohlgruber et al. | ......... 366/147 |
| 7,237,602 B2 | 7/2007 | Arai et al. | |
| 7,662,094 B2 * | 2/2010 | Iddan | ............. 600/176 |
| 2001/0054354 A1 | 12/2001 | Baudat et al. | |
| 2002/0038702 A1 | 4/2002 | Font-Freide et al. | |
| 2002/0124996 A1 | 9/2002 | Jukkola et al. | |
| 2003/0173062 A1 | 9/2003 | Lomax, Jr. et al. | |
| 2005/0092472 A1 | 5/2005 | Lewis | |
| 2005/0093183 A1 | 5/2005 | Lewis et al. | |
| 2005/0263262 A1 | 12/2005 | Lewis et al. | |
| 2005/0274500 A1 | 12/2005 | Baudat et al. | |
| 2006/0110301 A1 | 5/2006 | Lewis et al. | |

FOREIGN PATENT DOCUMENTS

EP 0 326 388 8/1989

* cited by examiner

*Primary Examiner* — Nina Bhat
(74) *Attorney, Agent, or Firm* — Patterson & Sheridan, LLP

(57) ABSTRACT

The invention provides a method and apparatus for integrating the heat transfer zones of plate fin and tube and finned tube exchangers and a catalytic mass transfer zone. The invention also provides a method for in situ regeneration of existing coated surface and augmentation of existing coated surface, or catalyst performance.

19 Claims, 5 Drawing Sheets

HEAT EXCHANGE SYSTEM

CROSS-REFERENCE TO RELATED APPLICATIONS

This application is a continuation of U.S. patent application Ser. No. 10/992,870, filed Nov. 19, 2004, now U.S. Pat. No. 7,622,094, which is herein incorporated by reference in its entirety.

BACKGROUND OF THE INVENTION

1. Field of the Invention

This invention pertains to the field of heat exchange and specifically to integrating a catalyst zone into an efficient heat exchanger.

2. Description of the Related Art

Plate fin and tube heat exchangers or externally finned tube exchangers have long been employed to recover process heat. These exchangers are most often employed to heat or cool a low density gas stream located on the finned side against a denser fluid with higher heat transfer coefficient within the tubes. The extended surface on the finned exterior pass allows greater heat transfer surface than a bare tube and provides greater heat transfer at a low-pressure drop.

The art has not heretofore recognized the unexpected advantage of applying a catalyst coating on the heat transfer fins, or support tubes and surrounding internal surface of the heat exchanger vessel/housing, to allow effective heat transfer while also allowing a catalytic reaction has not been recognized in the art.

SUMMARY OF THE INVENTION

The invention may be described in several ways as alternate embodiments of the novel discovery that positioning a mass transfer catalyst on the exterior surface of a plate and fin or finned tube heat exchanger achieves unexpected performance improvements over the conventional system of using separate catalyst beds and heat exchange elements.

The invention provides an improvement in a method of recovering energy using a heat exchanger that comprises:
  a. providing a heat exchange unit selected from the group consisting of plate and fin heat exchangers and finned tubing heat exchangers in a heat transfer system having a finned exterior side and tubing that forms a separate circulation path for an interior second working fluid;
  b. providing a first working fluid contacting the finned exterior side of the heat exchange unit
  c. feeding the first working fluid to contact the exterior finned side of a heat transfer zone to transfer heat between the first working fluid and an interior second working fluid within the tubing of the heat exchanger
  d. feeding the second working fluid into a tube or group of tubes to be heated or cooled by the first working fluid.
By adding the improvement that comprises:
  e. coating a portion of the exterior finned surface with a mass transfer catalyst to allow a mass transfer reaction between components of the first working fluid to be accelerated by the catalyst within the heat exchange zone.

The method may further comprise: feeding a third working fluid into a second separate circulation path to be heated or cooled by the first working fluid as disclosed in co-pending U.S. application Ser. No. 10/700,805 filed Nov. 3, 2003.

The method may further comprise: providing a plurality of interior working fluids, and providing each with a separate tubing circulation path in the interior tubing portion of the heat exchanger as disclosed in. U.S. application Ser. No. 10/700,805.

In a preferred embodiment the plurality of interior tubing circulation paths are interlaced and coating some or the entire finned surface with a catalyst to allow mass transfer within the heat exchange zone thereby accomplishing more effective heat transfer than would be possible with a plurality of tube side fluid streams arranged in series without interlacing the separate tubing circulation paths. In the method the second working fluid and the third working fluid may have the same composition or the second working fluid and the third working fluid have the a different composition In another optional embodiment the plurality of interior working fluids may have the same composition or at least one of the plurality of interior working fluids may have a different composition from the other interior working fluids. In a preferred embodiment the first working fluid is selected from the group consisting of flue gas, turbine exhaust gas, electrical generating plant stack gas, hydrocarbon gas, combustion exhaust gas, cat cracker gas, furnace exhaust, and mixtures thereof and the catalyst is selected from the group consisting of zeolites, NOX abatement catalysts, CO conversion catalysts, vanadium pentoxide, hydrocarbon cracking catalysts, SOX abatement catalysts, vanadium tungsten oxide catalysts, manganese oxide catalysts, and metal catalysts select from group VIII metals and their alloys. The preferred groups also include any sub grouping of the forgoing leaving out one or more members of each selection group. Especially preferred is the combination where the first working fluid is includes nitrogen oxides (NOX) and the catalyst is vanadium pentoxide or vanadium tungsten oxide on a titanium dioxide carrier.

The method may further comprise: in situ coating of the finned exterior surface of a heat exchange unit in an existing system with a catalytic coating. Alternatively the method may further comprise: rejuvenating the catalytic coating by injecting the catalyst upstream of the heat exchanger to renew in situ the coating of the finned exterior surface of a heat exchange unit in an existing system with a catalytic coating. In a preferred embodiment the catalyst is applied to the finned surface of the heat exchanger as a powder coating and deposited on the finned surface by giving the powder coating an electrical charge opposite to an electrical charge imposed on the finned exterior surface of the heat exchanger.

The invention may also be viewed as an energy recovery apparatus that comprises: a heat exchange unit selected from the group consisting of plate and fin heat exchangers and finned tube heat exchangers in a heat transfer system having a finned exterior side and tubing that forms a separate circulation path for an interior second working fluid and a catalytic coating surface covering at least a portion of the finned exterior side with a catalyst for a mass transfer reaction. In a preferred embodiment the apparatus further comprises a plurality of interior working fluids, and each confined within a separate interior tubing circulation path in the interior tubing portion of the heat exchanger, thereby providing additional heat recovery as disclosed in the above reference co-pending application Ser. No. 10/700,805. In a preferred embodiment the catalytic coating is selected from the group consisting of zeolites, NOX abatement catalysts, vanadium pentoxide, hydrocarbon cracking catalysts, SOX abatement catalysts, CO conversion catalyst, vanadium tungsten oxide catalysts, manganese oxide catalysts, and group VIII metal catalysts. The apparatus may further comprise means for injecting additional components upstream of the catalytic coating surface of the heat exchange surface to promote reactions with components of the first working fluid at the catalytic surface. For example ammonia or urea may be injected into a turbine exhaust stream up stream from a vanadium oxide catalyst to convert NOX to nitrogen and water at the catalyst coated surface. As the examples below show this system has a significantly lower pressure drop that the prior art system using separate heat exchange and catalytic zones. In a preferred apparatus the catalytic coating comprises vanadium pentoxide and the first working fluid is an exhaust stream from a gas turbine.

The apparatus may further comprise means for in situ formation of a catalytic coating on the finned exterior surface of the heat exchanger. A preferred means includes a means for injecting catalyst upstream from the heat exchanger for in situ deposition of catalyst on the heat exchanger exterior surface. In a preferred embodiment means for imposing opposite electrical charges on a catalytic material to be coated on the finned exterior surface of the heat exchanger and the finned exterior surface of the heat exchanger are included so that in situ electrostatic coating can be performed.

In summary, the invention provides a system for more efficient heat transfer in a plate fin and tube or finned tube exchanger while coating some or all of the finned surface with catalyst to simultaneously accomplish heat transfer and mass transfer. Additionally, the invention provides a system for the in situ maintenance and performance augmentation of a new or existing catalyst bed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention may be employed to increase the heat recovery efficiency of any gas turbine that produces a waste heat exhaust while simultaneously allowing catalytic conversion of one or more components in a heat exchange medium such as NOX or CO conversion. Therefore the invention integrated heat exchanger design can achieve the desired heat transfer while accomplishing mass transfer. By applying a catalyst such as vanadium pentoxide on a portion of the heat transfer fins that are maintained within a desired temperature range to promote a catalytic reaction and by adding ammonia or urea to a NOX containing first working fluid, exterior to the heat transfer apparatus, NOX content of the finned side working fluid can be reduced.

The invention also can use a method of interweaving streams with various working fluids in a common plate fin and tube or finned tube exchanger to accomplish more efficient heat transfer while simultaneously allowing a catalytic reaction on the finned side disclosed in a separate patent application filed on Nov. 3, 2003 U.S. Ser. No. 10/700,805.

The following examples are provided to illustrate the invention and not to limit the concepts embodied therein.

EXAMPLES

Example 1

Figure 1:
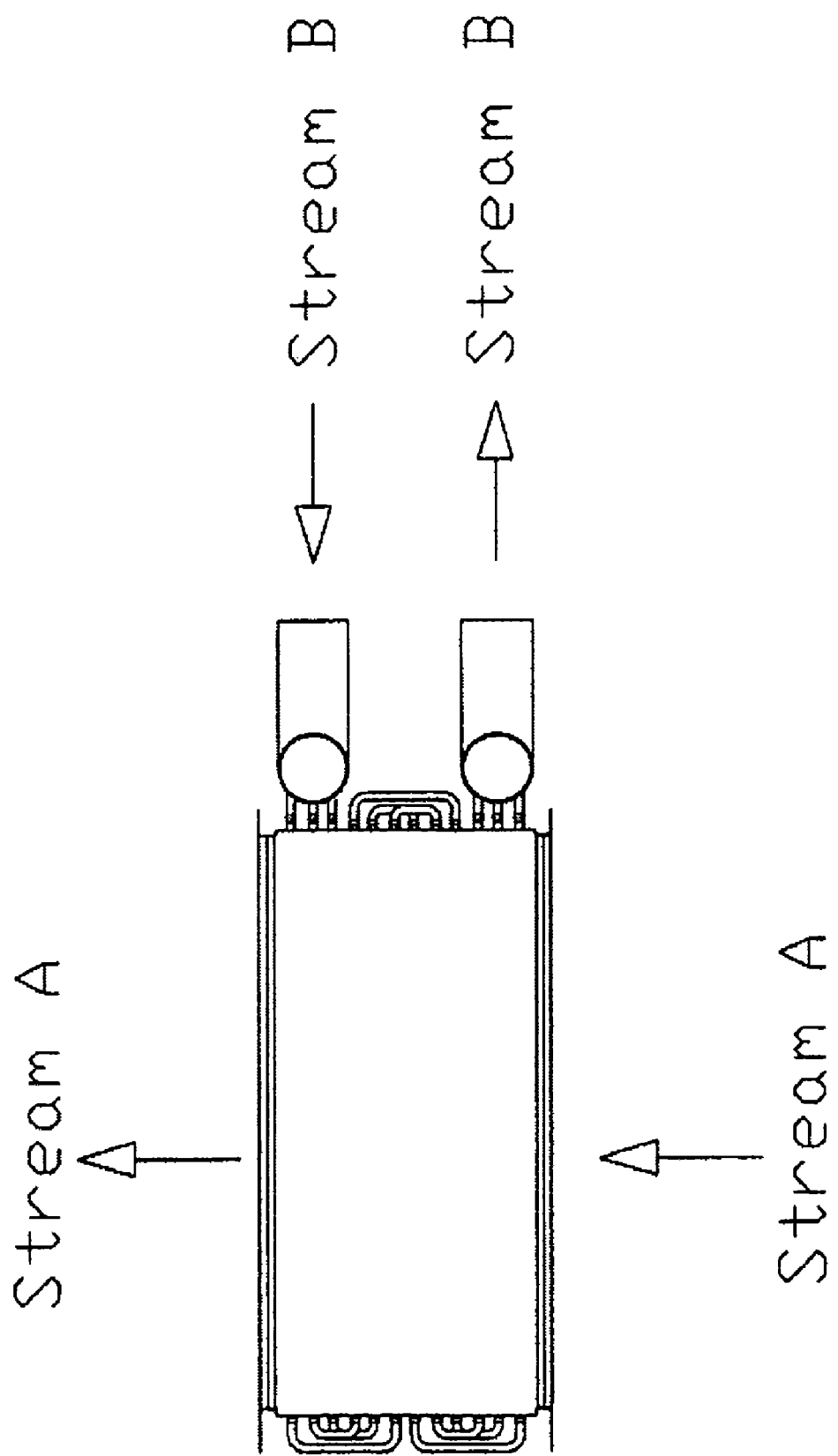
FIG. 1 is a sketch of a typical coil having two working fluids that can have the finned surface coated with catalyst to simultaneously allow mass transfer and heat transfer.
Figure 2:
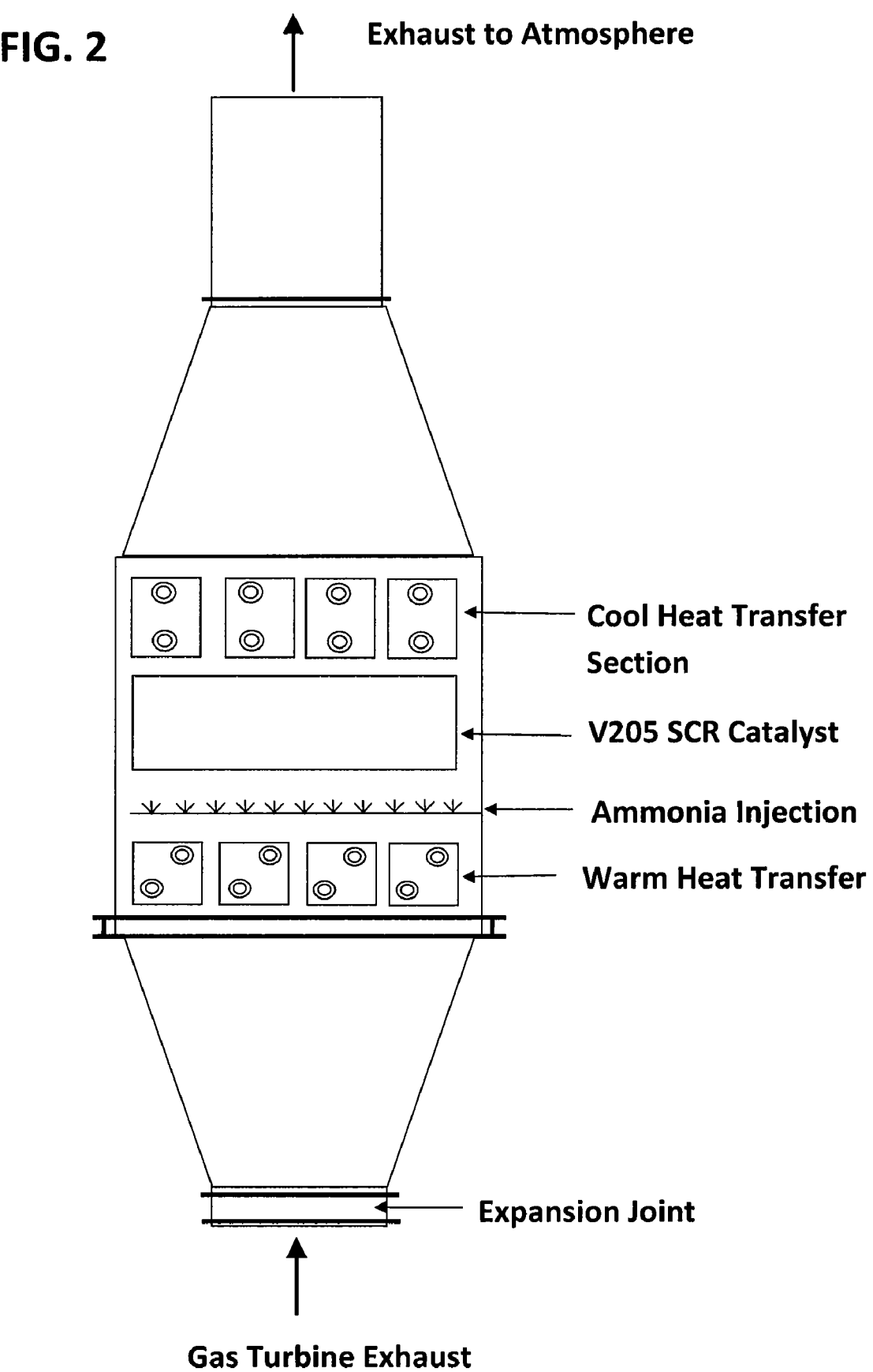
FIG. 2 shows a conventional Waste Heat Recovery system with a NOX reduction catalytic conversion zone with an NH3 injection grid.
Figure 3:
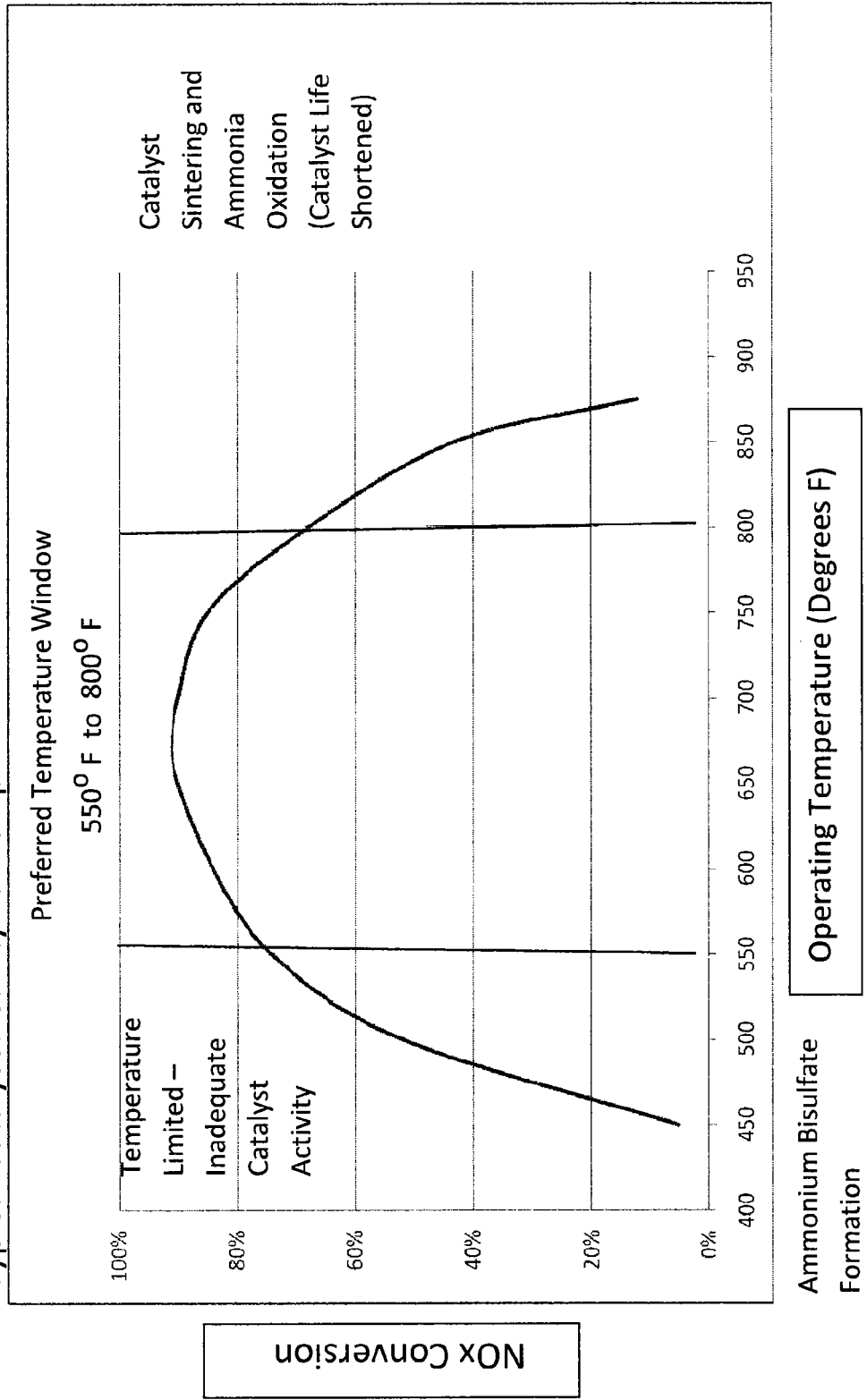
FIG. 3 shows a typical catalyst activity vs temperature chart for a Vanadium Tungsten Oxide catalyst and shows a preferred temperature window.

Existing Technology is shown in FIG. 2 for a Waste Heat Recovery System with integrated NOX reduction $V_2O_5$ catalyst zone on the exhaust of a gas turbine. A warm waste heat recovery zone cools the exhaust from the gas turbine while warming a desired working fluid, in this case a heat transfer medium. The exhaust gas is cooled to a preferred temperature for the selected NOX reduction catalyst, in this case Vanadium-Tungsten Oxide on a Porous Titanium Dioxide substrate ($V_2O_5$) with a preferred temperature window of 550 F to 800 F. The temperature is selected based on the NOX selectivity of the catalyst vs operating temperature, by desired catalyst life which is reduced at higher temperature, and by formation of ammonium bisulfate at lower temperatures. FIG. 3 shows a typical temperature vs NOX conversion curve for a Vanadium Tungsten Oxide Catalyst commonly referred to as $V_2O_5$. This could also be a zeolite catalyst with different performance criteria. Dilute ammonia is introduced thru a distribution grid upstream of the catalyst zone to promote the chemical reaction NH3+NOX=>H2O+N2. An additional cool heat transfer zone is provided to further cool the exhaust stream while warming a desired working fluid, in this case a heat transfer medium.

Figure 4:
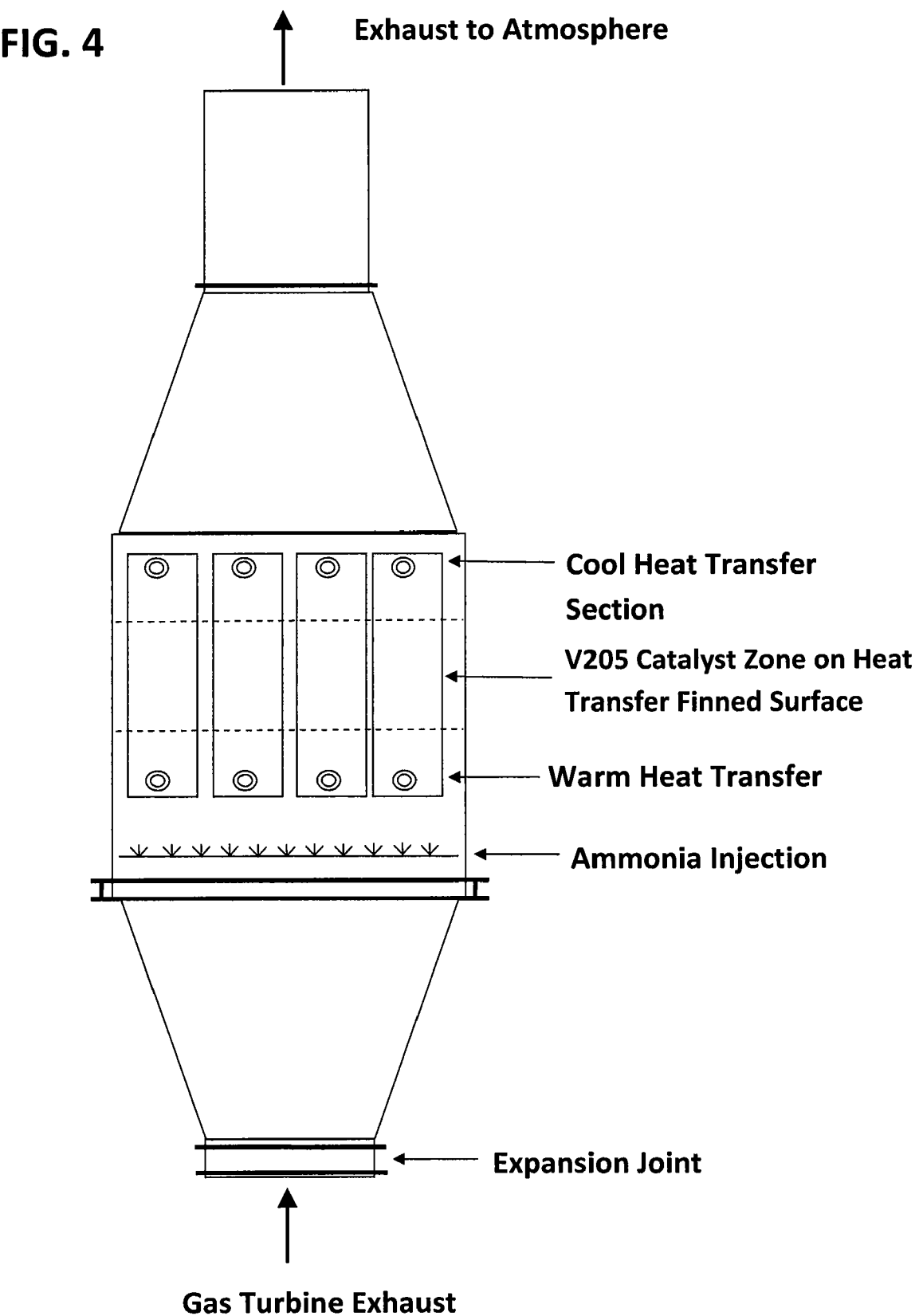
FIG. 4 shows the invention Waste Heat Recovery system with a NOX reduction catalyst coating applied to the finned surface.
Figure 5:
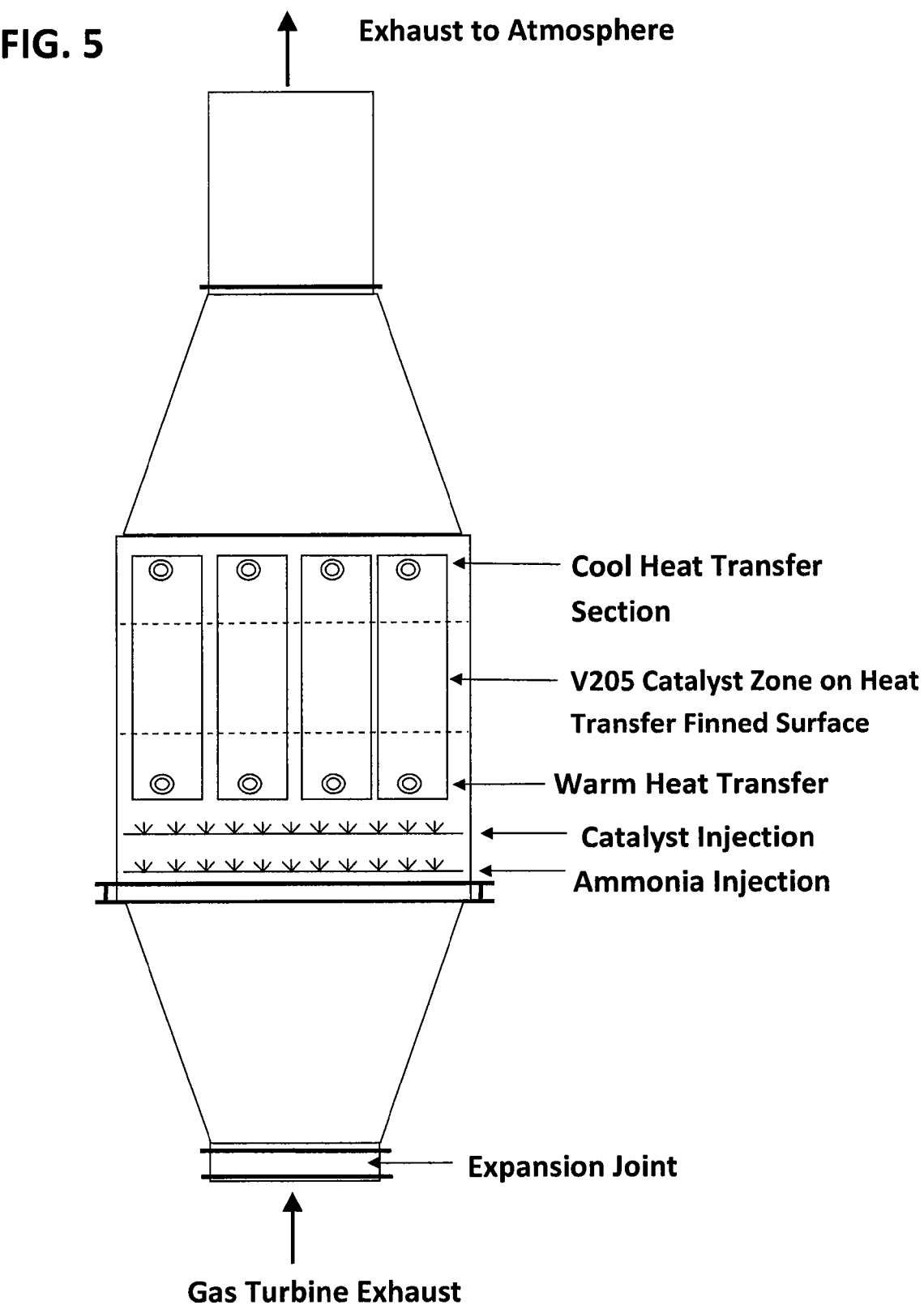
FIG. 5 shows the invention catalyst coating being applied in situ by injecting the catalyst upstream of the finned surface of the heat exchanger.

The invention example is shown in FIG. 4. The Vanadium Tungsten Oxide catalyst is applied to the exterior surface fins of a plate fin and tube or finned tube exchanger where the exhaust gas temperature is maintained in the preferred temperature range by sizing and choice of heat exchange properties to maintain optimum catalyst operation in the heat exchange zone. The NH3 is injected upstream of the zone and the NOX is converted to N2 and H2O.

Example 2

Using the example above, additional catalyst can be injected into the gas turbine exhaust upstream of the heat transfer surface and can be deposited on the finned surface of the heat exchanger. This may also be a powder coating and electroplated by electrostatic precipitation by electrically charging the heat transfer finned surface.

Example 3

A Solar Centaur gas turbine exhaust requires waste heat recovery for heating a thermal fluid and also requires NOx reduction based on the following design.

TABLE US 00001

| | |
|---|---|
| Design Basis | Solar Centaur 40-T4700 |
| Exhaust Flow | 137,000 #/hr |
| Exhaust Temp | 860° F. |

TABLE US 00001-continued

| NOx Content | 42 ppm vd |
|---|---|
| | mol % |
| Exhaust Gas Comp | |
| $O_2$ | 13.47 |
| $H_2O$ | 10.32 |
| $N_2$ | 71.46 |
| $CO_2$ | 3.86 |
| Ar | .86 |
| Desired NOx Reduction | 90% |
| $NH_3$ Slip | <10 ppm |
| Thermal Fluid | |
| Fluid | Xceltherm 600 |
| Hot Zone Duty | 9,000,000 BTU/hr |
| Fluid Temp In | 433 F. |
| Fluid Temp Out | 550 F. |
| Cool Zone Duty | 8,277,000 BTU/hr |
| Fluid Temp In | 325 F. |
| Fluid Temp Out | 433 F. |
| Heat Transfer Surface and Catalyst | |
| Hot Zone Coils Cross Section | 24 ft2 |
| Hot Zone Surface | 17300 ft2 |
| Cool Zone Coils Cross Section | 24 ft2 |
| Cool Zone Surface | 34,520 ft2 |
| The NOx catalyst beds cross-section | 24 ft2 |
| Pressure Drop Thru the System | |
| Hot Heat Exchange Zone Calc Pressure Drop | 1.2" WC |
| Catalyst Zone Pressure Drop | 3" WC |
| Cool Heat Exchange Zone Calc Pressure Drop | 2" WC |

Conventional System Description

The heat recovery will occur in two coil sections with SCR catalyst bed between. A single two fluid spray nozzle is used for NH3 injection. The exhaust exits the gas turbine at 860 F and enters the Hot Heat Exchange Zone where it is cooled to 617 F. Upon exiting the Hot Heat Exchange Zone, the dilute NH3 is injected into the exhaust stream which then flows to the catalyst zone. The catalyst zone is a honeycomb matrix with V2O5-TiO2 based catalyst. The NOX reacts with the NH3 forming water and N2. The exhaust then flows to the Cool Heat Exchange Zone and is further cooled to 386 F while heating the thermal fluid.

Invention System Description

The V2O5-TiO2 based catalyst is applied to at least a portion of the heat-transfer surface and the Hot and Cold Heat Transfer Zones can be combined if desired. The gas turbine exhaust pressure drop can be reduced thru these zones from 6.2" WC to 3.2" WC. This could allow the cross section of the waste heat recovery unit to be reduced until an equivalent pressure drop (6.2" WC) resulted reducing the size and cost of the unit. The dilute NH3 injection can be upstream of the Warm Heat Transfer Zone. By combining the two heat transfer zones and the catalyst zones, the exhaust flow path length can be reduced which will reduce the overall size and weight of the waste heat recovery housing. Preferably the plate fin and tube coils have a surface area ratio between the finned surface and the inside of tube surface between 8:1 and 40:1, therefore the slight reduction in heat transfer caused by the catalyst coating will have a small effect on heat transfer and can easily be compensated for by adding some small amount of coil surface.

While the foregoing is directed to embodiments of the present invention, other and further embodiments of the invention may be devised without departing from the basic scope thereof, and the scope thereof is determined by the claims that follow.

The invention claimed is:

1. A heat exchange apparatus, comprising:
   a housing;
   a first tubing section disposed in the housing and forming a first fluid circulation path with a finned exterior surface that is coated with a first catalytic material; and
   a second tubing section disposed in the housing and forming a second fluid circulation path with a finned exterior surface that is coated with a second catalytic material.

2. The apparatus of claim 1, further comprising a first injection section disposed in the housing and configured to inject a first material into contact with the finned exterior surfaces of the first and second tubing sections.

3. The apparatus of claim 2, further comprising a second injection section disposed in the housing and configured to inject a second material into contact with the finned exterior surfaces of the first and second tubing sections.

4. The apparatus of claim 3, wherein the first material is a catalyst and the second material is at least one of ammonia or urea.

5. The apparatus of claim 1, wherein the housing is in fluid communication with an exhaust stream of an operating member, wherein the operating member is a turbine.

6. The apparatus of claim 1, wherein the first and second catalytic materials include at least one of zeolite, a NOX abatement catalyst, vanadium pentoxide, a hydrocarbon cracking catalyst, a SOX abatement catalyst, a CO Conversion Catalyst, a vanadium tungsten oxide catalyst, a manganese oxide catalysts, and a group VIII metal catalyst.

7. The apparatus of claim 1, wherein the second fluid circulation path is separate from the first fluid circulation path, and wherein the second fluid circulation path is disposed adjacent to the first fluid circulation path.

8. The apparatus of claim 1, wherein the second fluid circulation path is separate from the first fluid circulation path, and wherein a portion of the second fluid circulation path overlaps a portion of the first fluid circulation path.

9. The apparatus of claim 1, wherein the first catalytic material is the same as the second catalytic material.

10. The apparatus of claim 1, wherein the first and second catalytic materials are in the form of a powder coating.

11. The apparatus of claim 1, wherein a ratio between the finned exterior surfaces of the first and the second fluid circulation paths and the inner surfaces of the first and second fluid circulation paths is between about 8:1 and about 40:1.

12. A heat exchange system, comprising:
    a housing having an inlet and an outlet;
    a heat exchanger disposed in the housing and having a warm heat transfer section, a catalyst heat transfer section, and a cool heat transfer section, wherein the catalyst heat transfer section includes a tubing surface that is coated with a catalytic material; and
    an injection member disposed in the housing and configured to inject a component into contact with the heat exchanger.

13. The system of claim 12, wherein the warm, catalyst, and cool heat transfer sections are interwoven to form a compact heat transfer unit.

14. The system of claim 12, wherein the housing is in fluid communication with an exhaust stream of an operating member, wherein the operating member is a turbine.

15. The system of claim 12, wherein the catalyst heat transfer section is disposed between the warm heat transfer section and the cool heat transfer section.

16. The system of claim 12, wherein the warm, catalyst, and cool heat transfer sections each form separate fluid circulation paths that are disposed adjacent to each other.

17. The system of claim 12, wherein the injection section is disposed upstream of the heat exchanger within the housing.

18. The system of claim 12, wherein the component comprises at least one of a catalyst, ammonia, and urea.

19. The system of claim 12, wherein the catalytic material is in the form of a powder coating.

* * * * *

UNITED STATES PATENT AND TRADEMARK OFFICE
CERTIFICATE OF CORRECTION

| | | |
|---|---|---|
| PATENT NO. | : 8,057,747 B2 | Page 1 of 1 |
| APPLICATION NO. | : 12/605937 | |
| DATED | : November 15, 2011 | |
| INVENTOR(S) | : Lewis et al. | |

It is certified that error appears in the above-identified patent and that said Letters Patent is hereby corrected as shown below:

ON THE TITLE PAGE

In the Related U.S. Application Data:

In Item (63) Please delete "Nov. 12, 2004" and insert --Nov. 19, 2004-- therefor.

Signed and Sealed this
Tenth Day of April, 2012

David J. Kappos
*Director of the United States Patent and Trademark Office*